United States Patent [19]

Nilsen et al.

[11] Patent Number: 4,988,556

[45] Date of Patent: Jan. 29, 1991

[54] POCKET MOUNT

[75] Inventors: Carl G. Nilsen, Brookfield; Gary L. Weisling, West Bend, both of Wis.; Arthur Sternheimer, Spring Valley, N.Y.; Ralph A. Montes, Howell; Douglas R. Schoen, North Brunswick, both of N.J.

[73] Assignee: Block Drug Co., Inc., Jersey City, N.J.

[21] Appl. No.: 346,912

[22] Filed: May 3, 1989

[51] Int. Cl.⁵ .................. G03B 21/64; B32B 3/10
[52] U.S. Cl. .................. 428/195; 40/159.2; 40/158.1; 40/159; 428/13; 428/14; 428/38; 428/136; 428/198; 428/130; 428/514; 428/337; 428/192; 353/120; 206/449
[58] Field of Search ............ 40/159.2, 361, 362, 40/363, 364, 365, 158.1, 159; 428/13, 14, 38, 136, 195, 198, 130, 514, 337, 192; 353/120; 206/449

[56] References Cited

U.S. PATENT DOCUMENTS

| | | | |
|---|---|---|---|
| 1,840,719 | 1/1932 | Hutchinson | 40/159.2 |
| 4,105,319 | 8/1978 | Wells et al. | 40/363 X |
| 4,263,357 | 4/1981 | Holson | 428/13 X |
| 4,320,158 | 3/1982 | Seeley | 428/136 X |
| 4,333,254 | 6/1982 | Stevenson | 40/159.2 |
| 4,393,107 | 7/1983 | Jenkins | 428/136 X |
| 4,402,585 | 9/1983 | Gardlund | 353/120 |
| 4,476,174 | 10/1984 | Carrera | 428/67 X |
| 4,635,796 | 1/1987 | Ozeki | 206/449 X |
| 4,642,925 | 2/1987 | Thompson | 40/159.2 |

FOREIGN PATENT DOCUMENTS

| | | | |
|---|---|---|---|
| 2447926 | 4/1975 | Fed. Rep. of Germany | 40/159.2 |
| 570942 | 7/1945 | United Kingdom | 428/13 |
| 893360 | 4/1962 | United Kingdom | 40/366 |

Primary Examiner—Ellis P. Robinson
Assistant Examiner—William P. Watkins, III
Attorney, Agent, or Firm—Ostrolenk, Faber, Gerb & Soffen

[57] ABSTRACT

A device for mounting a transparency. The device includes back and front sheets of transparent plastic. The outer edges of the sheets are continuously bonded together. In a preferred embodiment, an opaque coating on the front sheet defines one or more generally rectangular windows. Each window is variously sized to permit the transparency to be viewed therethrough but to prevent light from leaking around the transparency. The sheets are continuously bonded together along three sides of the window to form a pocket between the sheets for mounting the transparency. A slit is formed along a fourth side of the window for inserting the transparency into the pocket.

15 Claims, 19 Drawing Sheets

4,988,556

POCKET MOUNT

BACKGROUND OF THE INVENTION

1. Field of the Invention

The present invention relates generally to devices for mounting an individual transparency, such as exposed dental X-ray film, to store the transparency, to protect both sides of the transparency, to view the transparency with good contrast and/or without distortion, and/or to duplicate the transparency.

2. Description of the Related Art

U.S. Pat. No. 4,332,254 discloses an X-ray film mount assembly. The assembly includes a top sheet which is inked to form windows and a bottom sheet which is smaller than the top sheet. The sheets are attached to each other by welds along three sides of the windows.

Other prior art patents of interest include U.S. Pat. Nos. 3,564,745, 3,279,112, and 1,840,719.

SUMMARY OF THE INVENTION

The present invention is directed to a device for mounting one or more transparencies. The device includes back and front sheets of transparent plastic. The outer edges of the sheets are continuously bonded together. An opaque coating on the front sheet defines one or more generally rectangular windows. The windows are sized so that the transparencies can be viewed through the windows. However, the windows prevent light from "leaking" around the transparencies. The sheets are continuously bonded together along three sides of each of the windows to form one or more pockets between the sheets for mounting the transparencies. An opening slit is formed along a fourth side of each of the windows for inserting the transparencies into the pockets.

In a preferred embodiment of the invention, dental X-ray film is inserted into the pockets by lifting a flap formed by the opening slit away from the front sheet. After the film is inserted into the pockets, the flap is released and falls back into place. Within the pockets, the film is precisely aligned with the windows for clear viewing with good contrast. While in the pockets, the film can be viewed through an overhead projector without distortion. Furthermore, the film can be contact duplicated without being removed from the pockets. Indicia and notations can be made directly on the opaque coating. The device can be conveniently folded, stored, and/or mailed.

The present invention is also directed to a preliminary article of manufacture from which a plurality of the above-described devices can be formed. In a preferred embodiment, several such devices can be efficiently formed from a single blank with a minimum of wasted material.

The present invention is also directed to an entirely transparent device.

Other features and objects of the present invention will become apparent from the following detailed description of preferred embodiments of the invention considered in conjunction with the accompanying drawings.

DETAILED DESCRIPTION OF PREFERRED EMBODIMENTS

Detailed Description of First Embodiment

Figure 1:
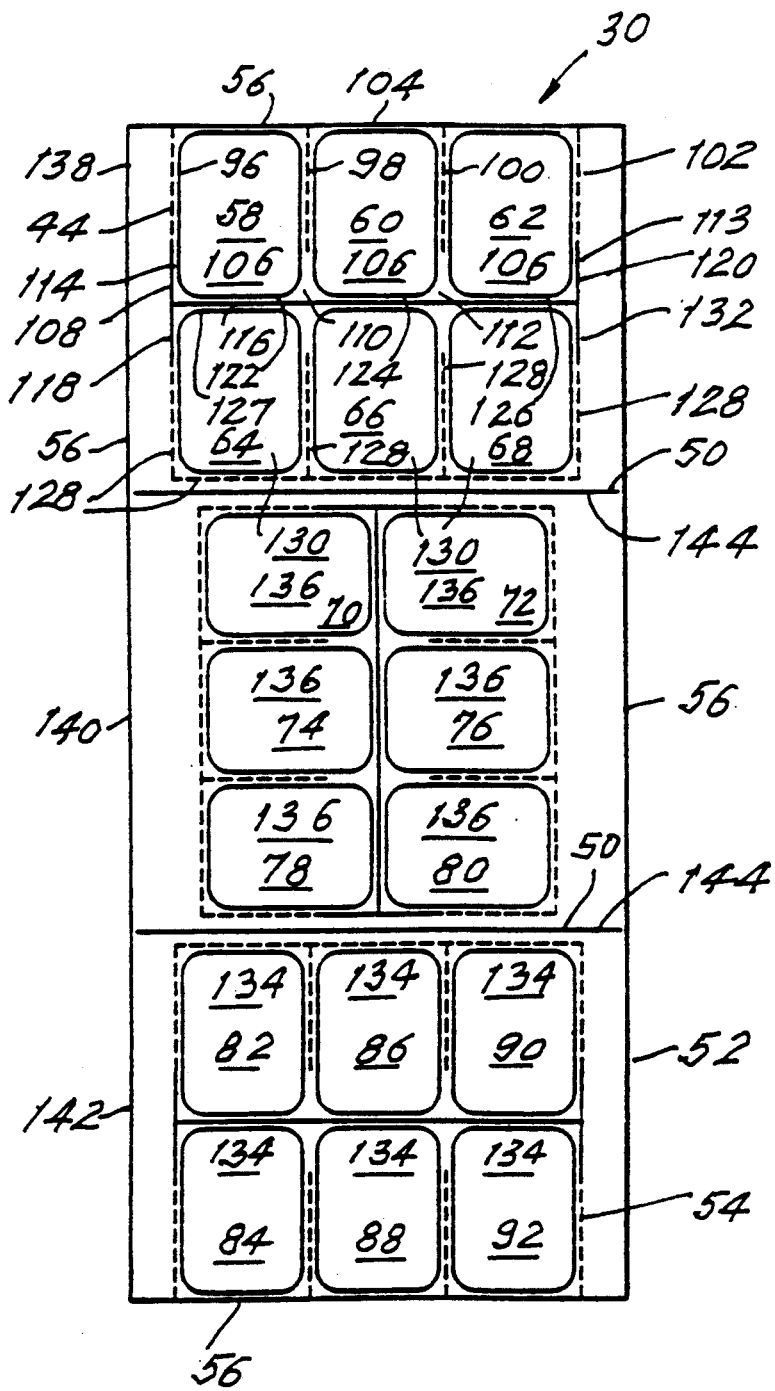
FIG. 1 is a plan view of a mount in accordance with a first embodiment of the present invention.
Figure 2:
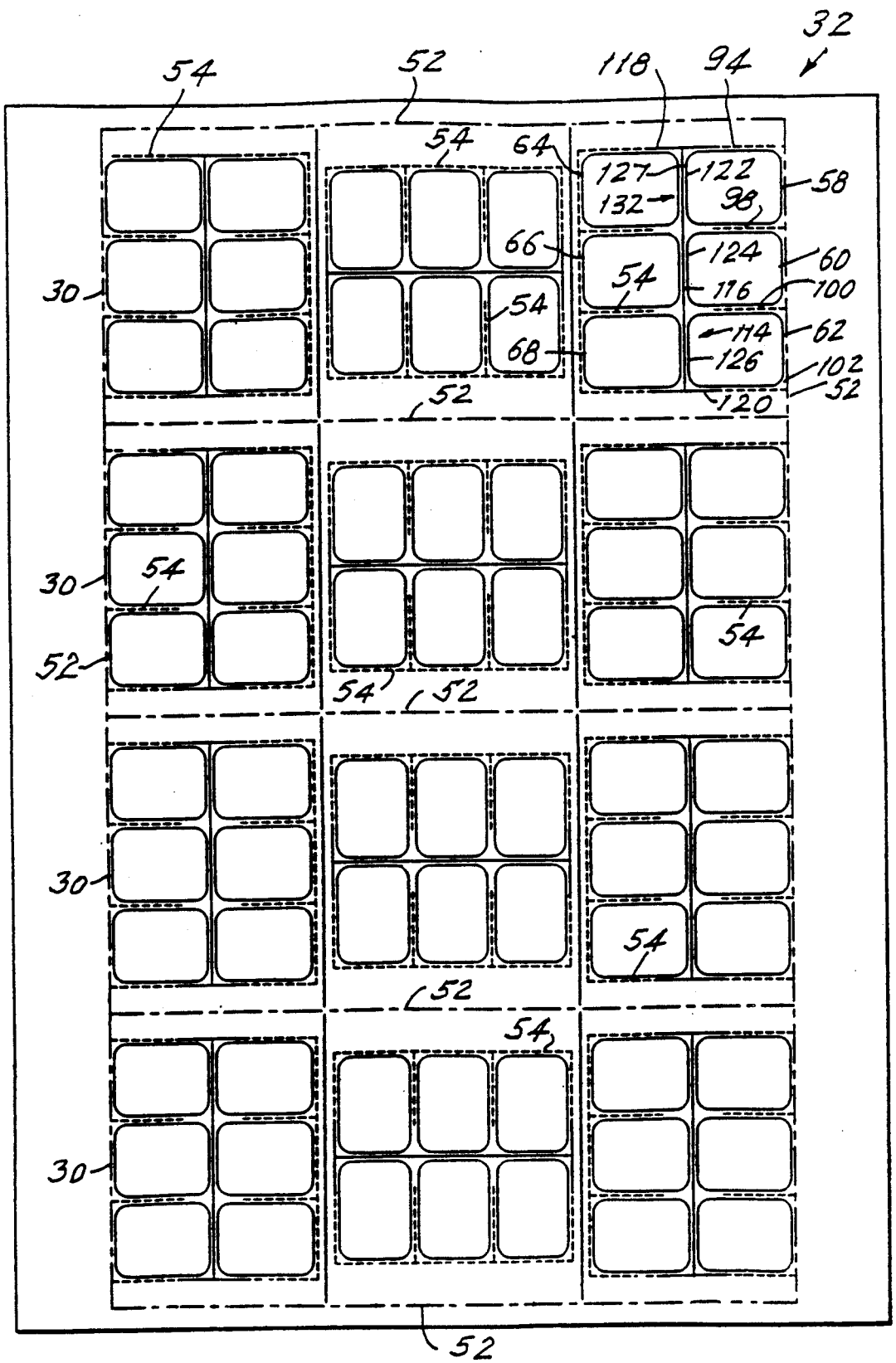
FIG. 2 is a reduced plan view of a blank for forming the mount of FIG. 1.

A mount 30 in accordance with a first embodiment of the present invention is illustrated in FIG. 1. Four such mounts 30 are cut out of a single blank 32 (FIG. 2). The blank 32 is formed by laying a back sheet 34 (FIG. 3) onto a front sheet 36 (FIG. 4) and then bonding the sheets 34 & 36 together while simultaneously cutting the individual mounts 30 therefrom.

The front sheet 36 is formed of clear non-plasticized rigid polyvinylchloride with a thickness of 0.005 inches (0.13 mm). The front surface of the front sheet 36 is silk screened with a light gray opaque ink to a matte texture while masking portions of the front sheet 36 to form windows indicated generally at 38. The entire front surface of the front sheet 36 (within the outer edges 40 of the sheet 36) is rendered opaque by such silk screening except for the individual rectangular windows 38. For clarity, the opaqueness of the silk screened ink is not illustrated in the drawings except to the extent that the ink defines the edges of the windows 38.

Such silk screening creates four sets of such windows 38 with eighteen windows 38 to a set. Each set of eighteen windows 38 corresponds to one of the mounts 30.

Each window 38 is generally rectangular with rounded corners indicated generally at 42. Each window 38 is sized such that when dental X-ray film (not illustrated) is placed against the window 38, light can pass through the window 38 to permit clear viewing of the film. However, the opaque ink prevents light from traveling or "leaking" around the film. Thus, when the mount 30 is grasped by a dentist and held up to the light or when the mount 30 is used in an overhead projector, film within the mount 30 can be easily seen with good contrast.

Figure 3:
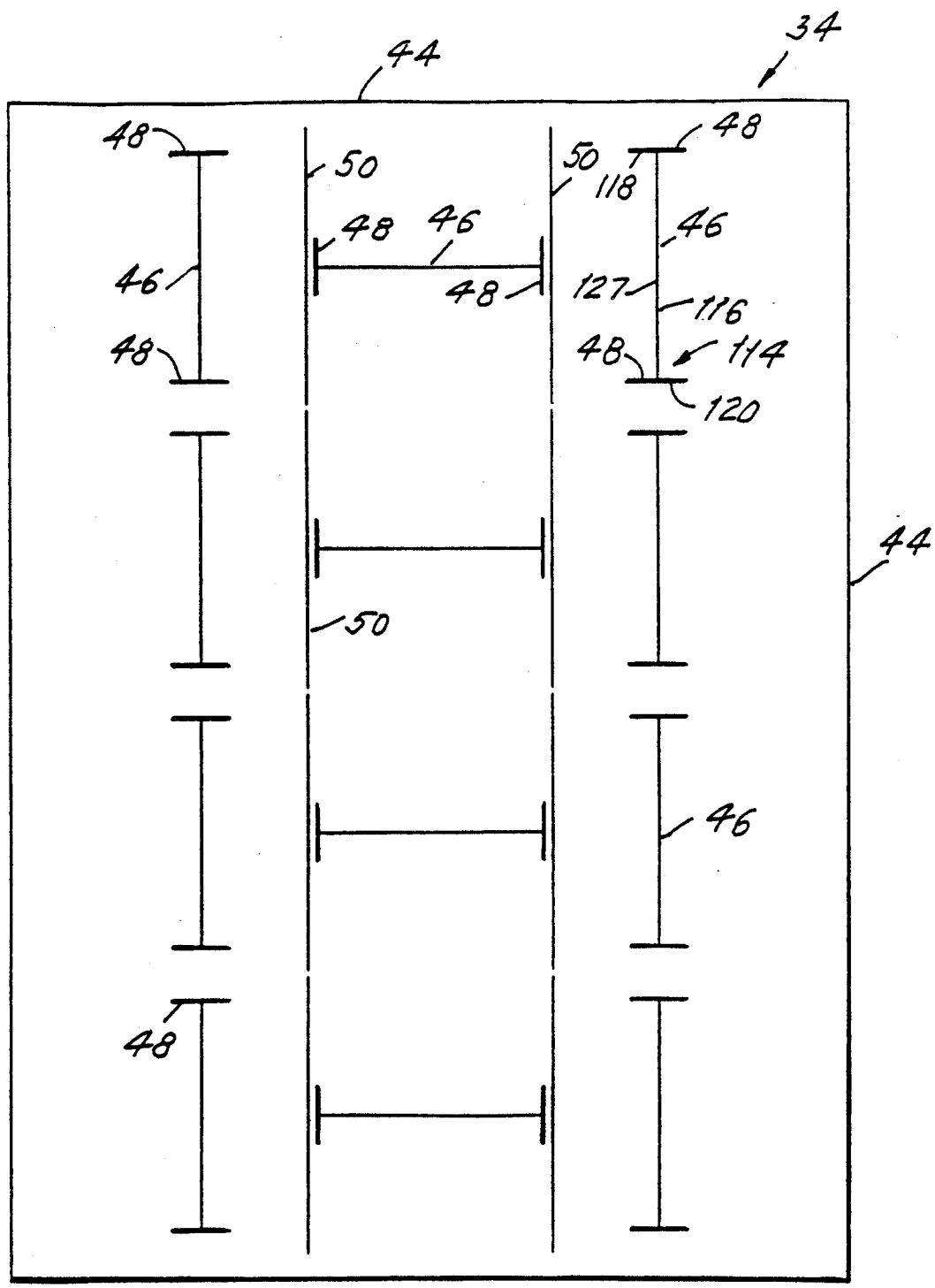
FIG. 3 is a reduced plan view of a back sheet of the blank of FIG. 2.
Figure 4:
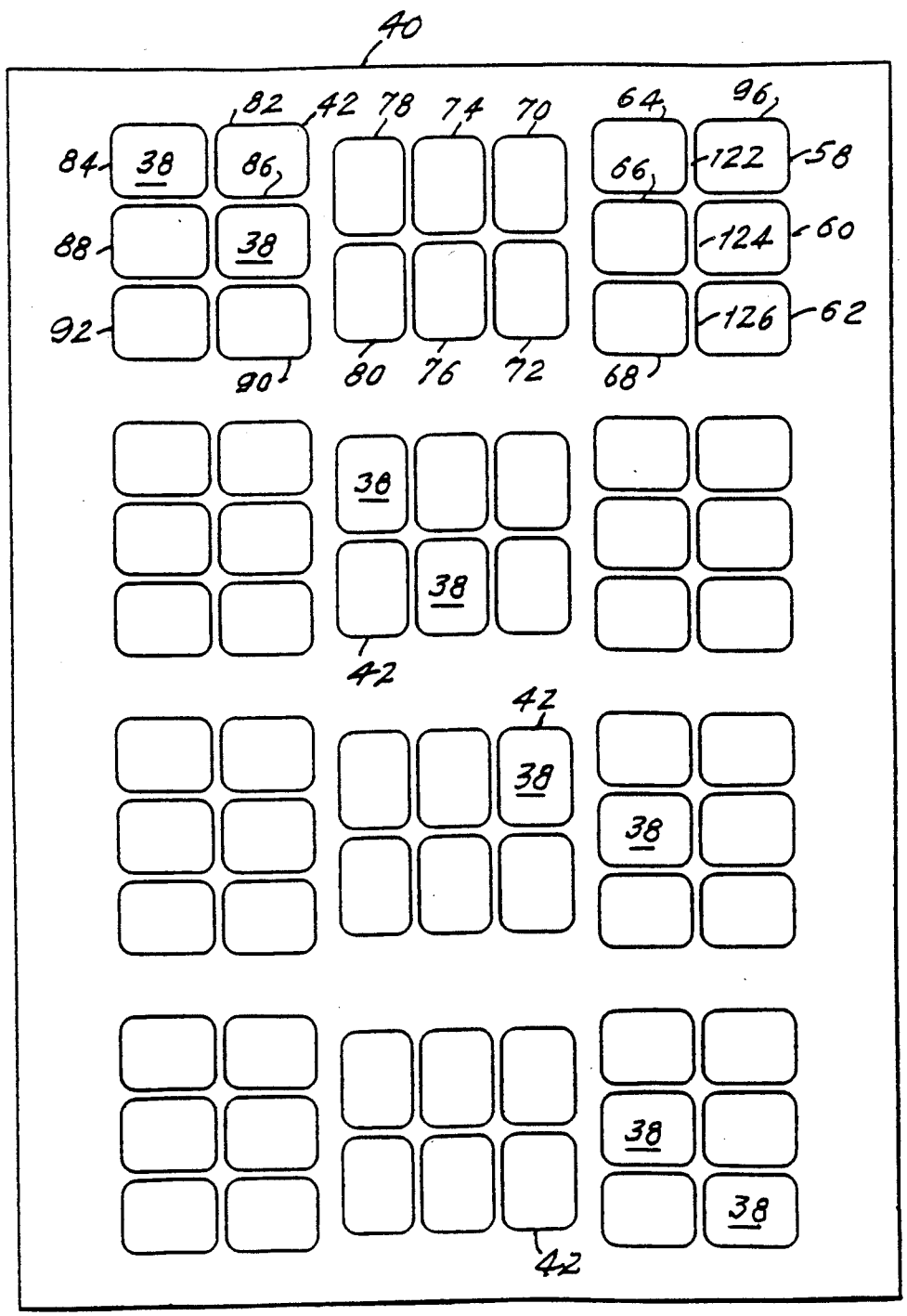
FIG. 4 is a reduced plan view of a front sheet of the blank of FIG. 2.

Referring now to FIG. 3, the back sheet 34 is formed of clear non-plasticized rigid polyvinylchloride with a thickness of 0.005 inches (0.13 mm). The sheet 34 has outer edges 44, opening slits indicated generally at 46, and side slits indicated generally at 48. There are four sets of these opening slits 46 and side slits 48 across the length of the back sheet 34 with each set corresponding to a separate mount 30. The back sheet 34 also includes four pairs of folding slits 50. Each pair of folding slits 50 corresponds to a separate mount 30.

The blank 32 is formed by laying the back sheet 34 against the back surface of the front sheet 36 after the windows 38 have been formed on the front surface of the front sheet 36. The resulting double thickness of the sheets 34 & 36 provides sufficient rigidity for handling (a soft flexible product would not be as easy to handle). However, the sheets 34 & 36 have some flexibility for easy handling and, if desired, folding.

The detailed illustration of the blank 32 in FIG. 2 includes cut/bond lines indicated generally by dashed lines 52 and bond lines indicated generally by dotted lines 54. Along the cut/bond lines 52, the sheets 34 & 36 are (1) bonded to each other by radio frequency bonding and (2) simultaneously severed or cut to separate the individual mounts 30 from the blank 32. The cut/bond lines 52 are illustrated by dashed lines only for purposes of illustration. The cut/bond lines 52 are actually continuous and form a single bond between the sheets 34 & 36 with no separation along the length of the bond. Along the bond lines 54, the sheets 34 & 36 are continuously bonded to each other by radio frequency bonding. The bond lines 54 are illustrated by dotted lines only for purposes of illustration. The bond lines 54 are actually continuous and form a single bond between the sheets 34 & 36 with no separation along the length of the bond. The strength of the bonds formed along the cut/bond lines 52 and the bond lines 54 is equivalent to the strength of the sheets 34 & 36. The continuous bonds are stronger than spot welds.

The mounts 30 have improved rigidity because the sheets 34 & 36 are bonded to each other along the cut/bond lines 52 to form the periphery 56 (FIG. 1) of each mount 30. Furthermore, since the back sheet 32 and the front sheet 34 are coextensive within the periphery or edges 56 of each mount 30, the mount 30 has no areas with only a single thickness.

Referring now to FIG. 1 in detail, the windows 38 of the mount 30 include six upper windows 58-68, six middle windows 70-80, and six bottom windows 82-92. A bond line 94 is located along one side 96 of the window 58. Another bond line 98 is located between the windows 58 & 60. Similarly, a bond line 100 is located between the windows 60 & 62 and a bond line 102 is located along a side of the window 62. The bond lines 94 & 98-102 and a bonded edge 104 of the periphery 56 define pockets indicated generally at 106 for receiving film.

The bond lines 94 & 98-102 begin at the bonded edge 104 but extend along only two-thirds of the entire length of the windows 58-62. That is, the back sheet 34 is not bonded to the front sheet 36 at locations 108-113. Thus, a flap 114 defined by an opening slit 116 and side slits 118 & 120 can be pulled away from lower sides 122-126 of the windows 58-62 to insert the film into the pockets 106.

After the film is inserted into the pockets 106, the flap 114 is released and falls back into place, i.e., parallel with the remainder of the back sheet 36. This keeps the film in place within the pockets 106 adjacent to and aligned with the windows 58-62 for proper viewing, and with the film fully covered and protected. Since the bond lines 94 & 98-102 are continuous, the dental X-ray film slides smoothly into the pockets 106. The film cannot inadvertently fall out of the pockets 106 through the opening slit 116 because a portion 127 of the back sheet 34 opposed to the pockets 106 stays flat against the front sheet 36 to prevent the film from sliding along the back surface of the front sheet 36.

The mount 30 also includes bond lines indicated generally at 128 for defining pockets indicated generally at 130. The opening slit 116 and the side slits 118 & 120 define a second flap 132 for inserting film into the pockets 130. Thus, the slits 116-120 define two opposed flaps 114 & 132.

The use of only a single bond line 98, etc. between the windows 58, etc., the sharing of the slits 116-120, etc., and the use of the bonded edge 104 to define the pockets 106 creates an extremely compact construction which can be efficiently manufactured.

Pockets indicated generally at 134 are associated with the bottom windows 82-92. These pockets 134 are mirror images of the pockets 106 & 130. Pockets indicated generally at 136 are associated with the middle windows 70-80 and are essentially identical to the pockets 134, 106, & 130, except that the pockets 136 are turned sideways.

Thus, the mount 30 is divided into a top third 138 with the pockets 106 & 130, a middle third 140 with the pockets 136, and a lower third 142 with the pockets 134. The thirds 138-142 are separated by fold lines 144 so that the mount 30 can be conveniently folded for filing and/or mailing (e.g., in small envelopes or dental charts). The fold lines 144 include the folding slits 50. The folding slits 50 permit the mount 30 to be folded in the direction of the front sheet 36 without stretching and/or tearing the back sheet 34 or any of the cut/bond or bond lines 52 & 54.

The mount 30 is offset printed with black ink (not illustrated) on the opaque gray silk screened ink to personalize and identify the mount 30 and to indicate areas for notations. The silk screened ink accepts and clearly shows such notations by pencil, pen, marker, or typewriter anywhere on the opaque surface of the front sheet 36.

Description of Alternative Embodiments

The features of the first embodiment can be modified without departing from the scope of the present invention to produce a variety of different mounts depending on the compactness required and the intended use of the mount. Over ninety such modifications are presently contemplated. Examples are described below in connection with second through tenth embodiments of the invention.

Figure 5:
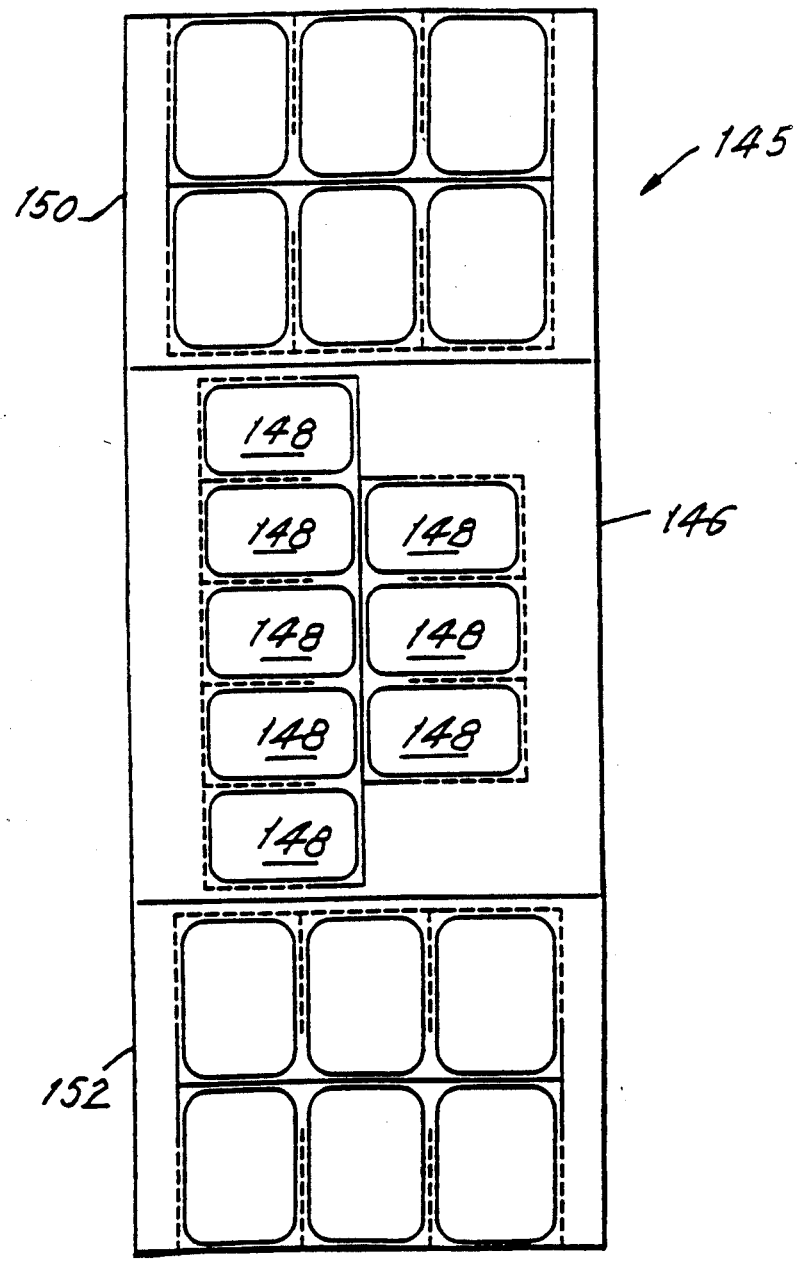
FIG. 5 is a plan view of a mount in accordance with a second embodiment of the present invention.

A mount 145 in accordance with a second embodiment of the present invention is illustrated in FIG. 5. The mount 145 is generally similar to the mount 30 of FIG. 1 and features shared by the mounts 145 & 30 will not be described further herein.

The mount 145 has a middle third 146 with eight relatively narrow pockets 148 oriented roughly as a triangle for receiving eight relatively narrow transparencies therewithin. The mount 145 can also receive six relatively large transparencies within an upper third 150 and six relatively large transparencies within a bottom third 152.

Figure 6:
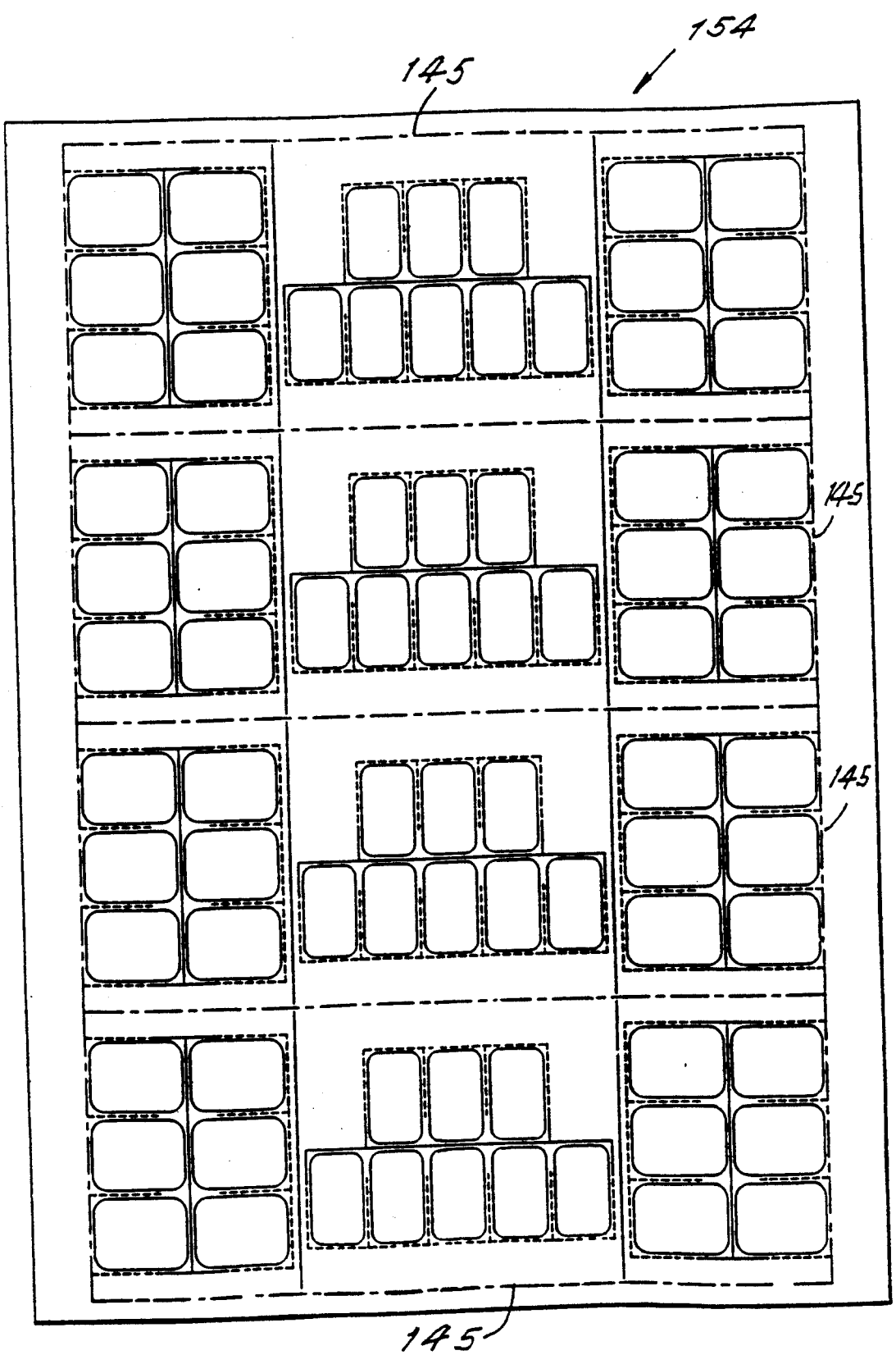
FIG. 6 is a reduced plan view of a blank for forming the mount of FIG. 5.

Four of the mounts 145 can be cut out of a single blank 154 (FIG. 6).

Figure 7:
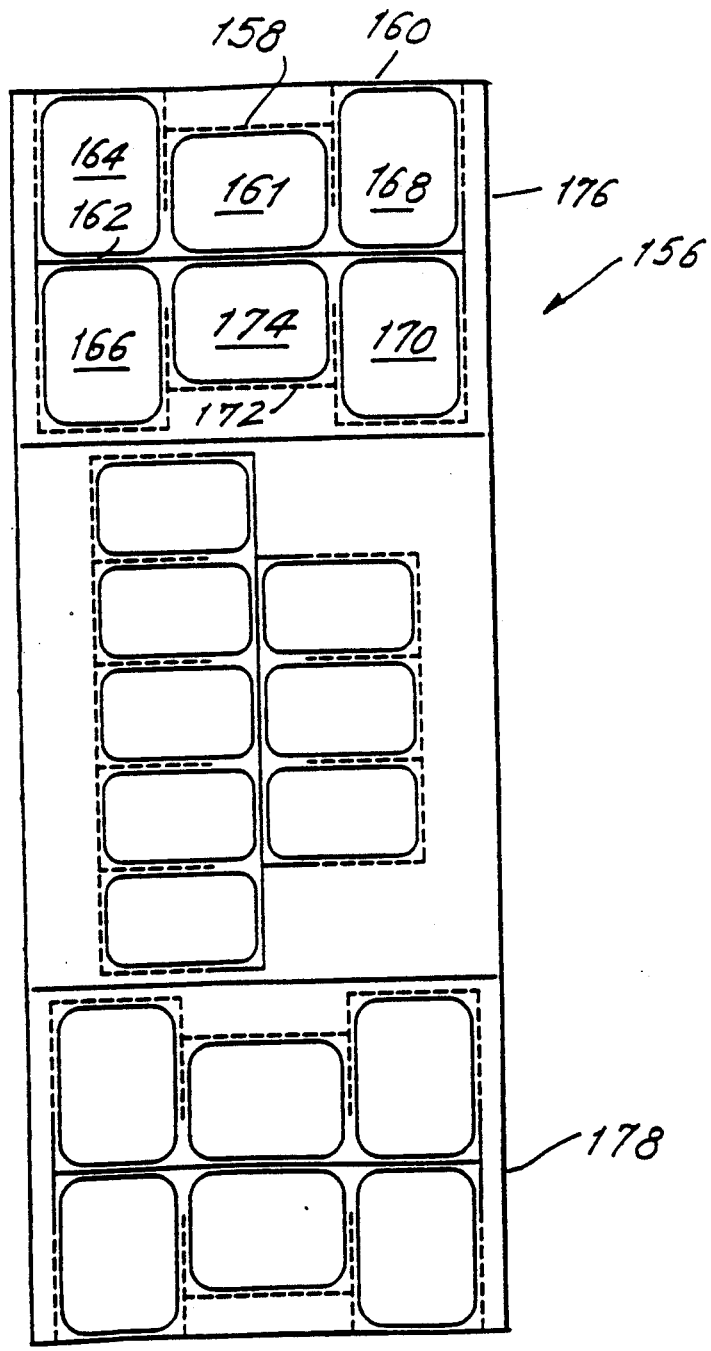
FIG. 7 is a plan view of a mount in accordance with a third embodiment of the present invention.

A mount 156 in accordance with a third embodiment of the present invention is illustrated in FIG. 7. The mount 156 is generally similar to the mounts 30 & 144 and features shared by the mounts will not be described further herein.

The mount 156 includes a bond line 158 spaced inwardly from the sealed periphery 160 of the mount 156 forming a pocket 161 which is wider in the direction of an opening slit 162 than four other pockets 164–170. A bond line 172 defines another pocket 174 which, like the pocket 161, is wider in the direction of the opening slit 162 than the pockets 164–170. The pockets 161, 164–170, & 174 are located within an upper third 176. The mount 156 includes a bottom third 178 which is a mirror image of the upper third 176.

Figure 8:
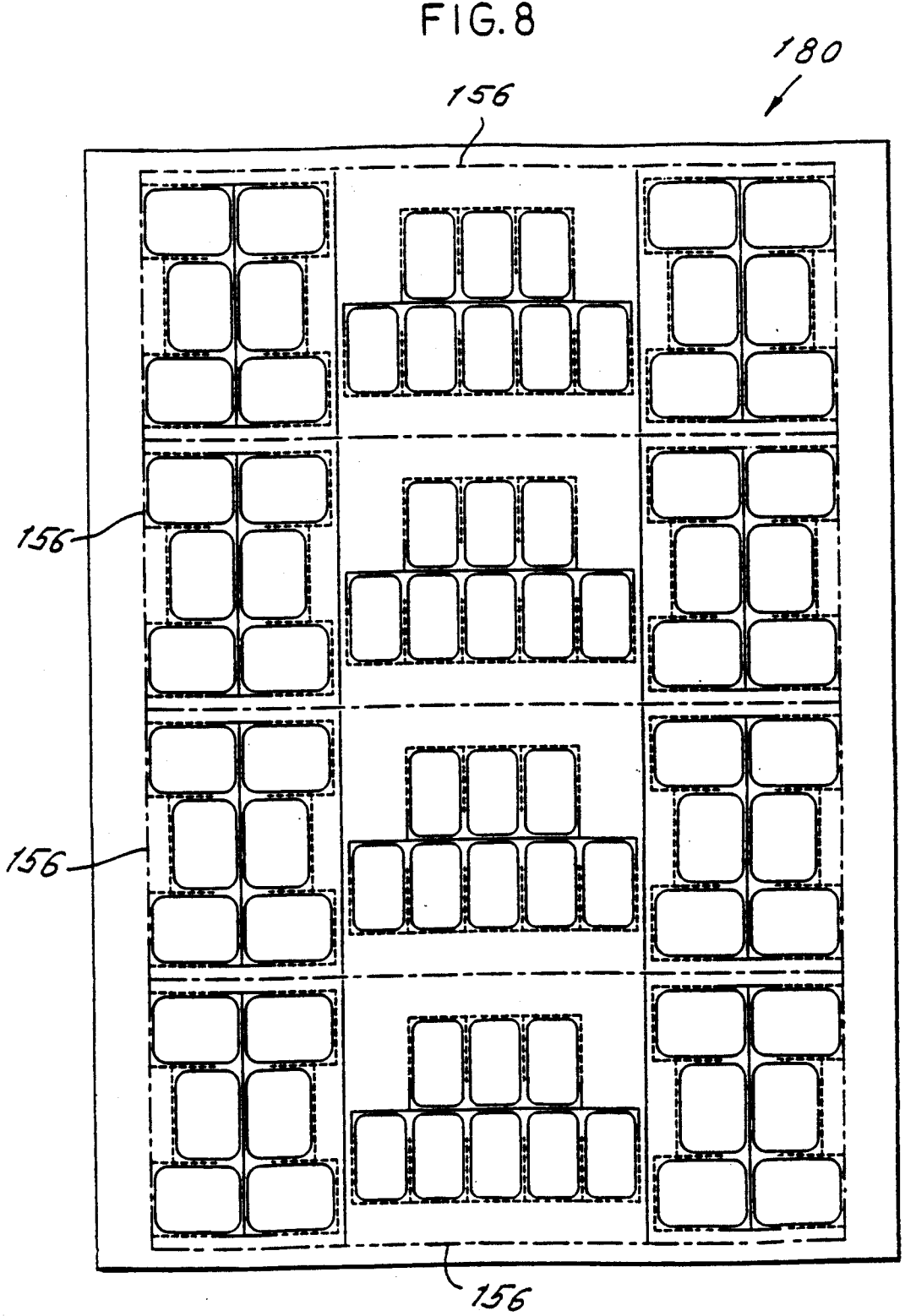
FIG. 8 is a reduced plan view of a blank for forming the mount of FIG. 7.

Four of the mounts 156 can be cut out of a single blank 180 (FIG. 8).

Figure 9:
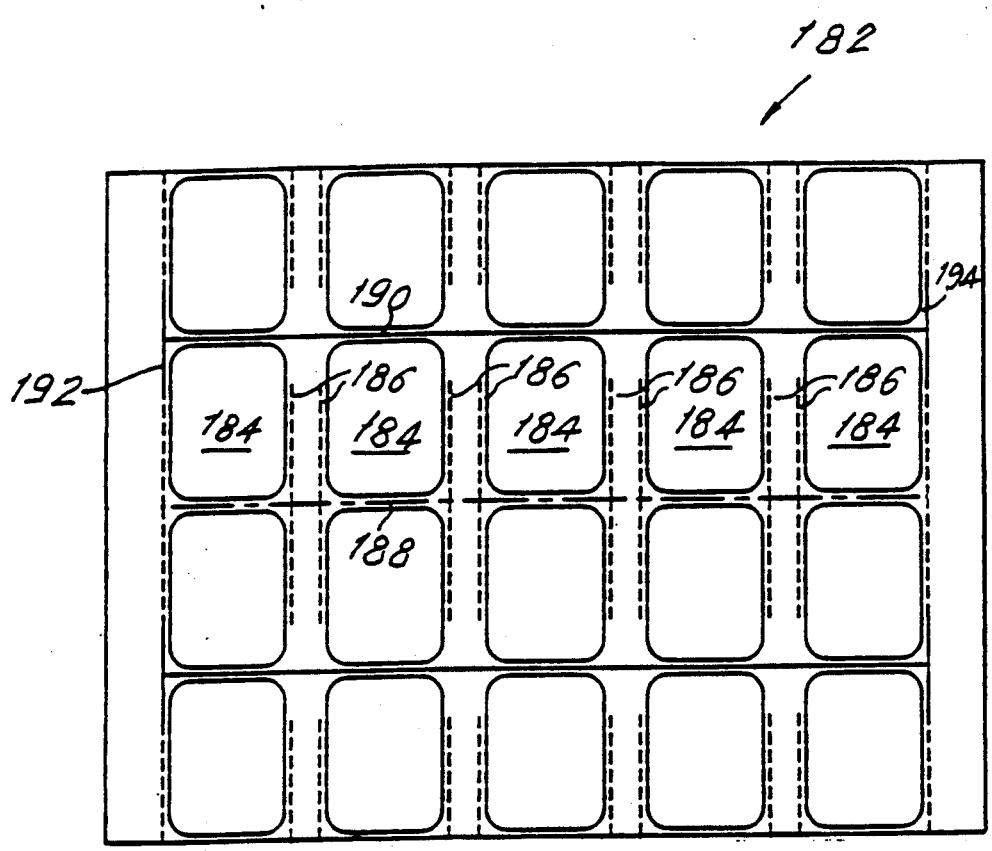
FIG. 9 is a plan view of a mount in accordance with a fourth embodiment of the present invention.

A mount 182 in accordance with a fourth embodiment of the present invention is illustrated in FIG. 9. The mount 182 is generally similar to the mounts already described and features shared by the mounts will not be described further herein.

The mount 182 has five pockets indicated generally at 184 each of which are separated by pairs of bond lines 186. Notations can be written in the space between the bond lines 186. A single bond line 188 is located at an end of each of the five pockets 184. The five pockets 184 share a common opening slit 190 and a single pair of side slits 192 & 194. There are four such sets of five pockets 184. The bond line 188 extends entirely across the middle of the mount 182 to separate and help define two of the sets of pockets 184. The mount 182 is symmetrical about the bond line 188.

Figure 10:
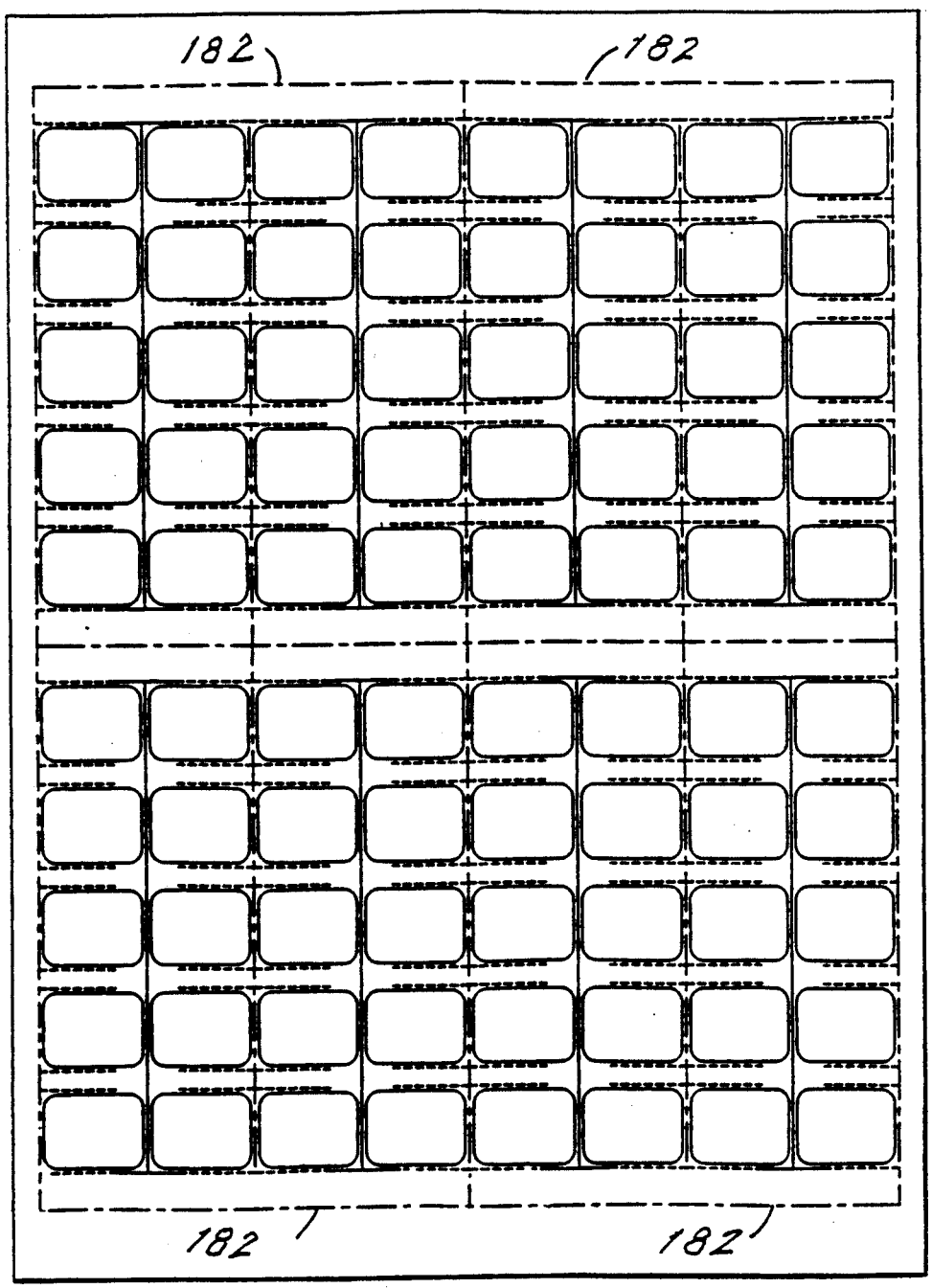
FIG. 10 is a reduced plan view of a blank for forming the mount of FIG. 9.

Four of the mounts 182 can be cut out of a single blank 196 (FIG. 10).

Figure 11:
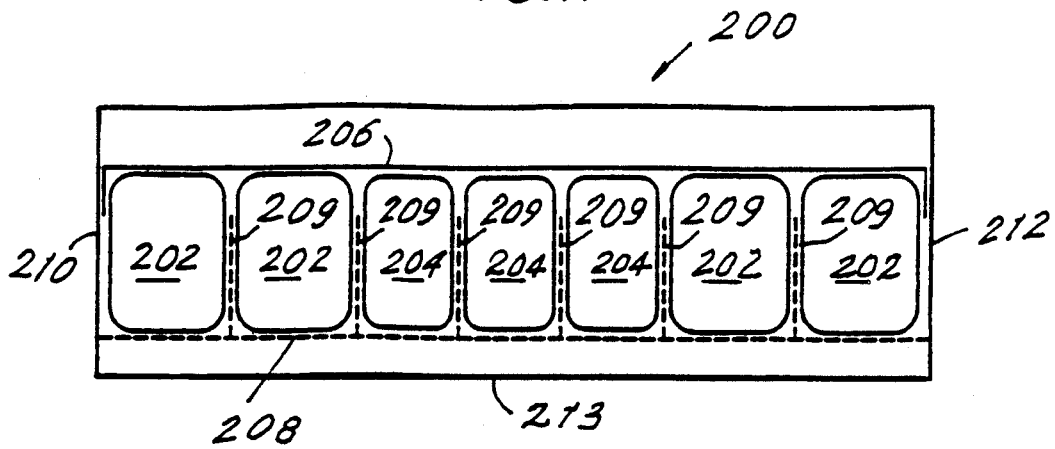
FIG. 11 is a plan view of a mount in accordance with a fifth embodiment of the present invention.

A mount 200 in accordance with a fifth embodiment of the present invention is illustrated in FIG. 11. The mount 200 is generally similar to the mounts already described and features shared by the mounts will not be described further herein.

The mount 200 includes four relatively large pockets 202 and three relatively small pockets 204. All seven of the pockets 202 & 204 share a common opening slit 206 and a common bond line 208. The pockets 202 & 204 are separated by individual weld lines 209. Two edges 210 & 212 of the pockets 202 are defined by the bonded periphery 213 of the mount 200.

Figure 12:
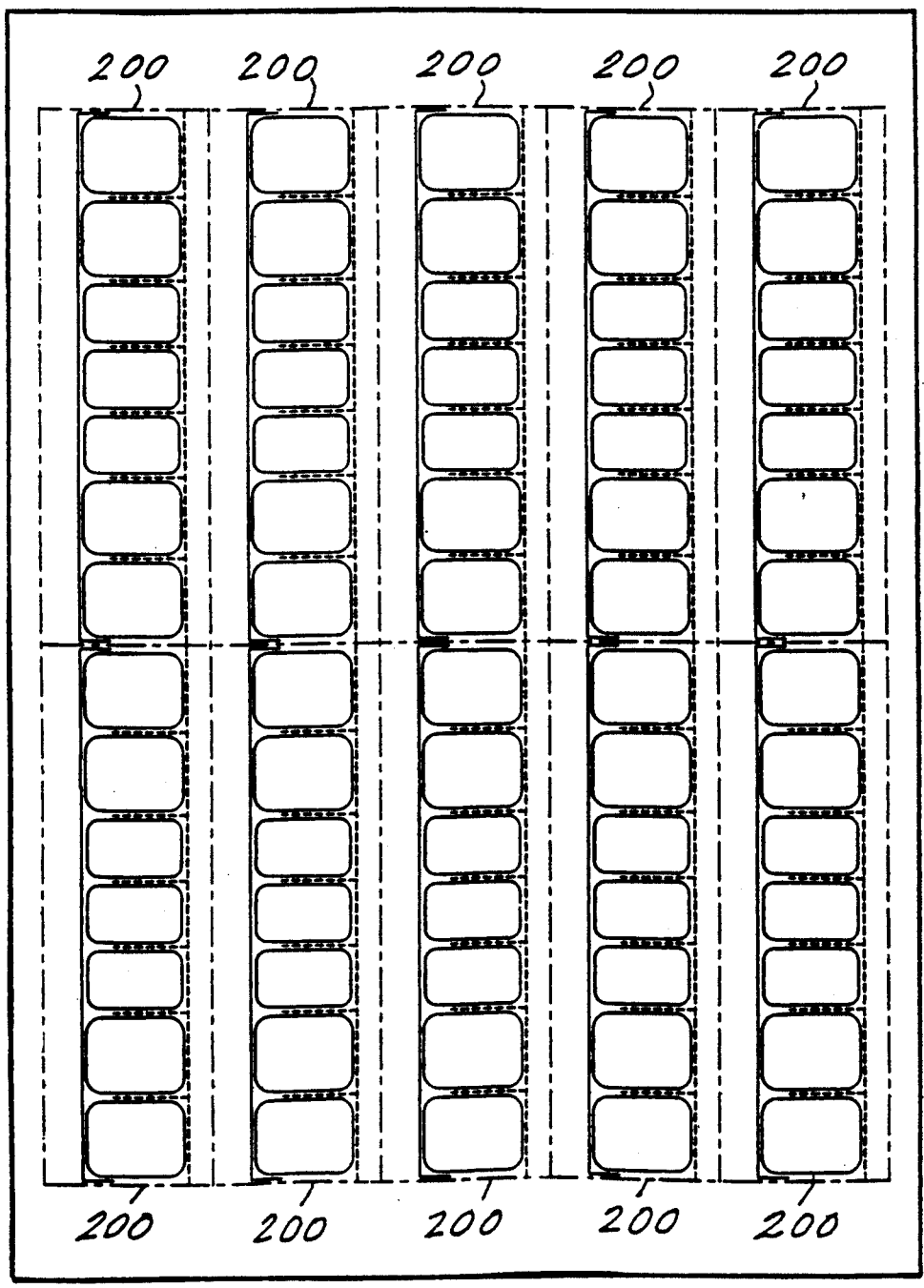
FIG. 12 is a reduced plan view of a blank for forming the mount of FIG. 11.

Ten of the mounts 200 can be cut from a single blank 214 (FIG. 12).

Figure 13:
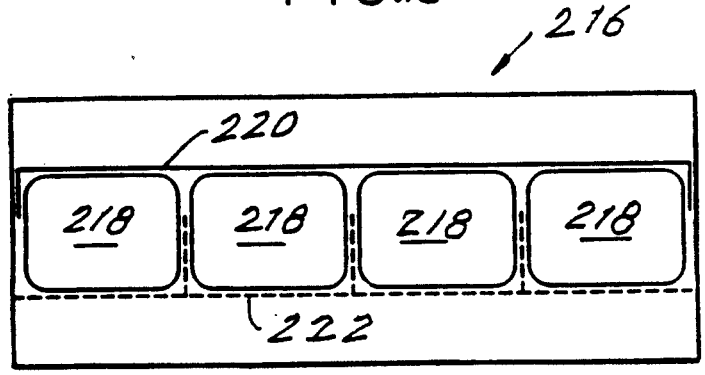
FIG. 13 is a plan view of a mount in accordance with a sixth embodiment of the present invention.

A mount 216 in accordance with a sixth embodiment of the present invention is illustrated in FIG. 13. The mount 216 is generally similar to the mounts already described and features shared by the mounts will not be described further herein.

The mount 216 has only four rectangular pockets 218. The longer sides of the rectangular pockets 218 are defined by a common opening slit 220 and a common bond line 222.

Figure 14:
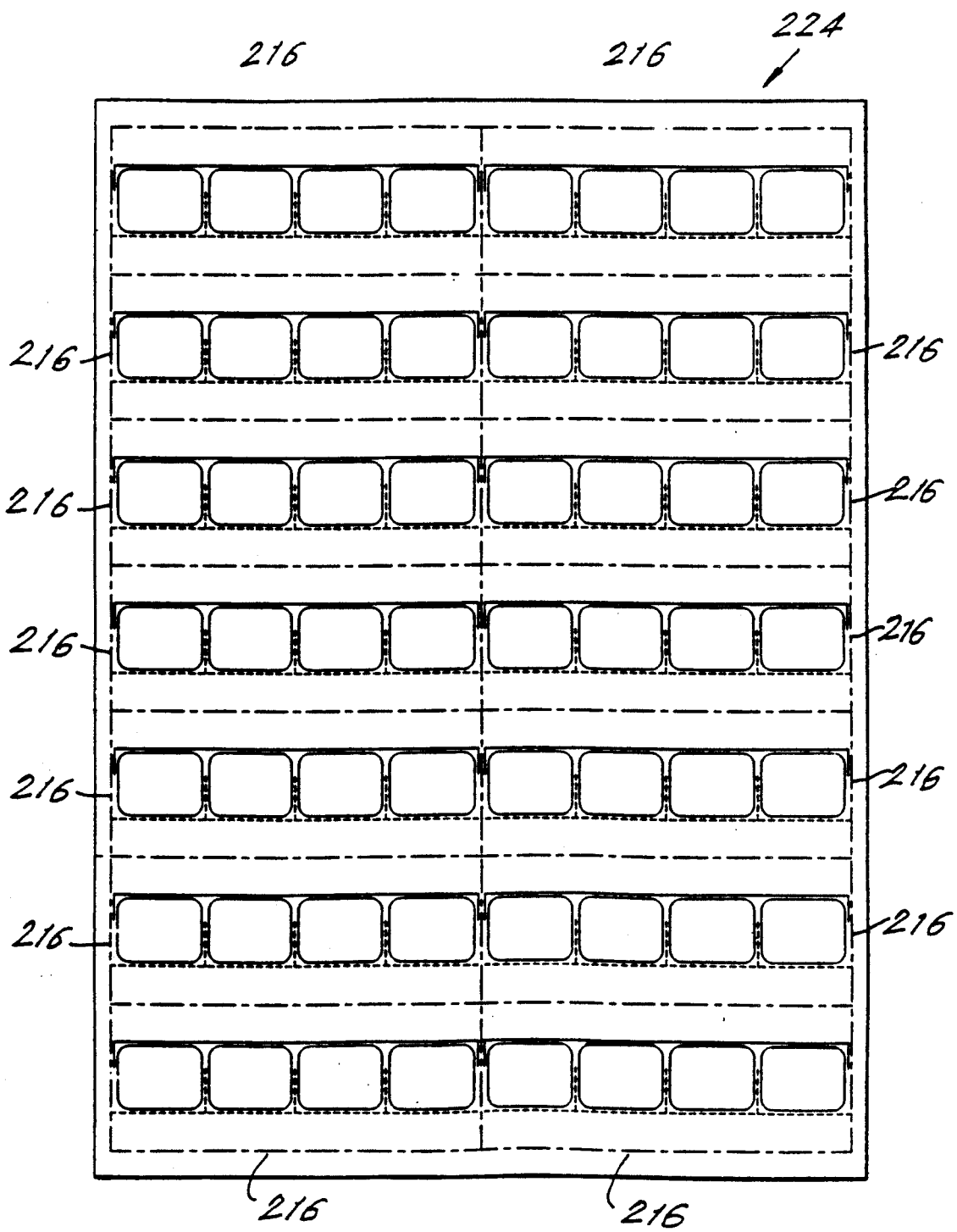
FIG. 14 is a reduced plan view of a blank for forming the mount of FIG. 13.

Fourteen of the mounts 216 can be cut out of a single blank 224 (FIG. 14).

Figure 15:
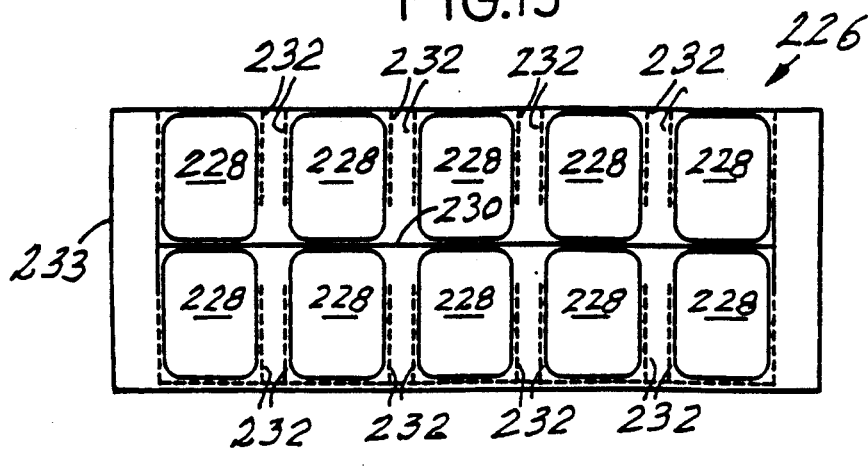
FIG. 15 is a plan view of a mount in accordance with a seventh embodiment of the present invention.

A mount 226 in accordance with a seventh embodiment of the present invention is illustrated in FIG. 15. The mount 226 is generally similar to the mounts already described and features shared by the mounts will not be described further herein.

The mount 226 has two sets of pockets 228 separated by a common opening slit 230. The pockets 228 are separated by pairs of parallel spaced apart bond lines 232. Notations can be written in the space between the bond lines 232. An outer side of each one of the pockets 228 is formed by the bonded periphery 233 of the mount 226.

Figure 16:
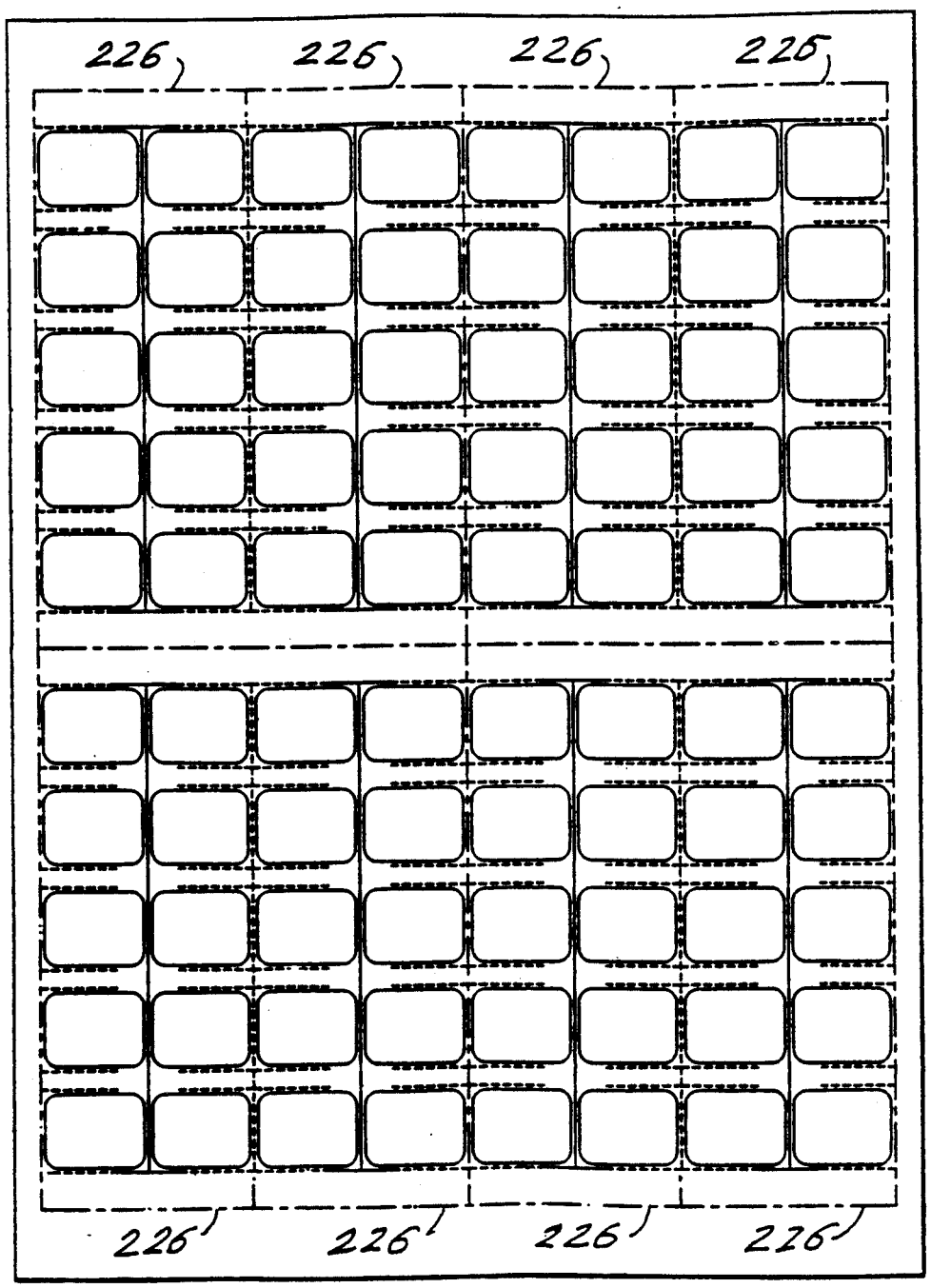
FIG. 16 is a reduced plan view of a blank for forming the mount of FIG. 15.

Ten of the mounts 226 can be cut out of a single blank 234 (FIG. 16).

Figure 17:
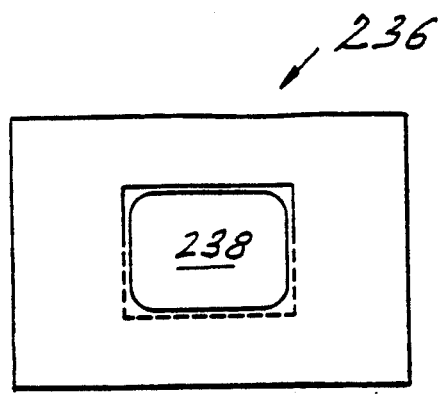
FIG. 17 is a plan view of a mount in accordance with an eighth embodiment of the present invention.

A mount 236 in accordance with an eighth embodiment of the present invention is illustrated in FIG. 17. The mount 236 is generally similar to the mounts already described and features shared by the mounts will not be described further herein.

The mount 236 has only a single pocket 238. A relatively large opaque surface is provided for indicia and/or notations.

Figure 18:
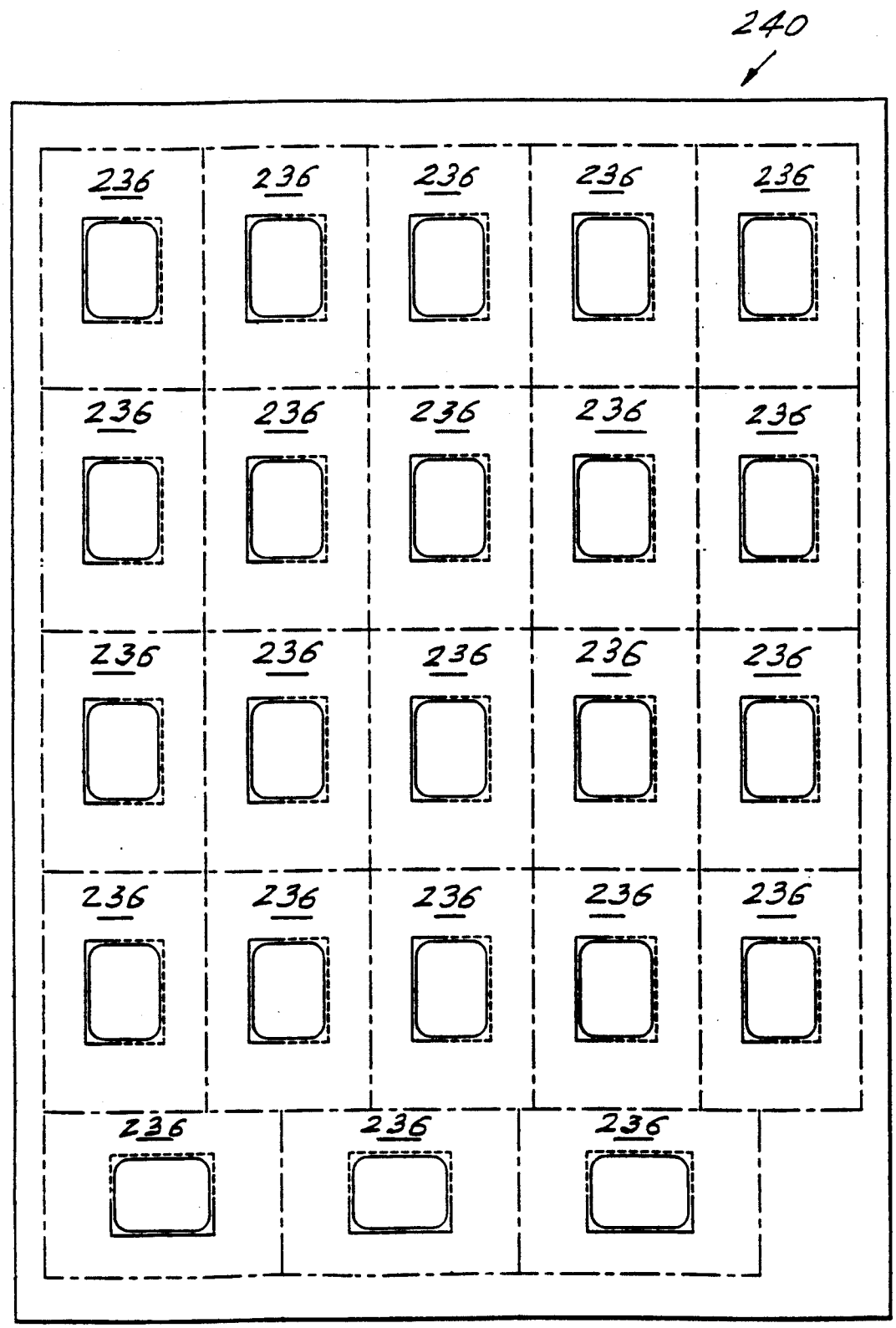
FIG. 18 is a reduced plan view of a blank for forming the mount of FIG. 17.

Twenty-three of the mounts 236 can be cut out of a single blank 240 (FIG. 18).

Figure 19:
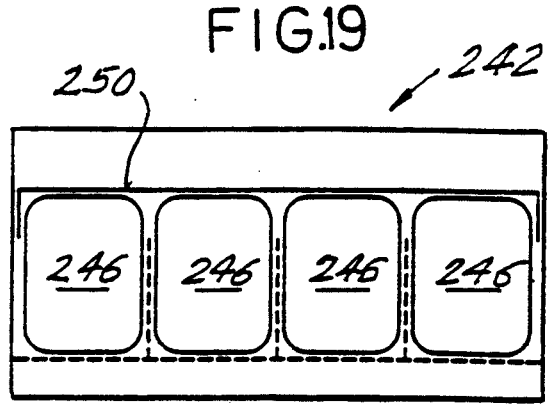
FIG. 19 is a plan view of a mount in accordance with a ninth embodiment of the present invention.

A mount 242 in accordance with a ninth embodiment of the present invention is illustrated in FIG. 19. The mount 242 is generally similar to the mounts already described and features shared by the mounts will not be described further herein.

The mount 242 has four generally rectangular pockets 246 with a short side of each pocket 246 being defined by a common opening slit 250.

Figure 20:
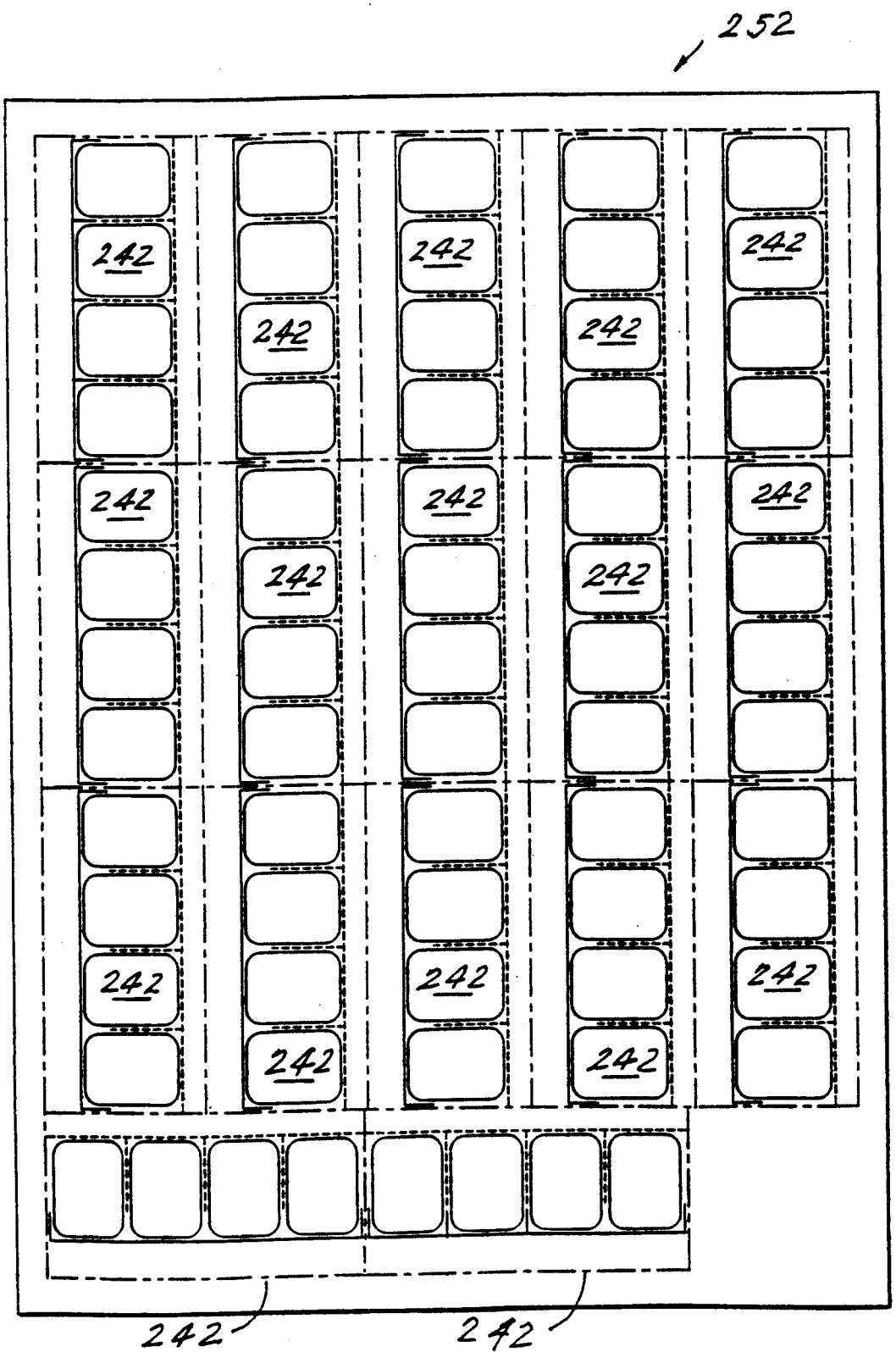
FIG. 20 is a reduced plan view of a blank for forming the mount of FIG. 19.

Seventeen of the mounts 242 can be cut out of a single blank 252 (FIG. 20).

Figure 21:
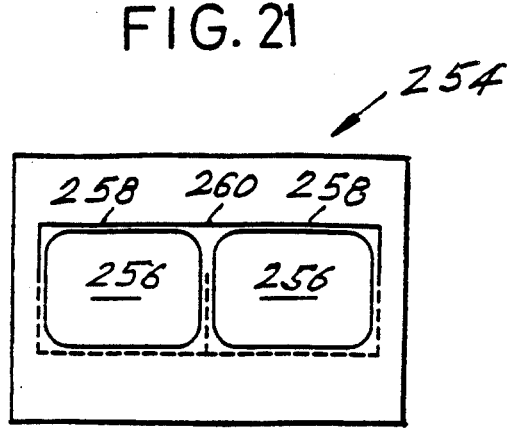
FIG. 21 is a plan view of a mount in accordance with a tenth embodiment of the present invention.

A mount 254 in accordance with a tenth embodiment of the present invention is illustrated in FIG. 21. The mount 254 is generally similar to the mounts already described and features shared by the mounts will not be described further herein.

The mount 254 has two pockets 256 with a wide side 258 of each of the pockets 256 being directed toward a common opening slit 260.

Figure 22:
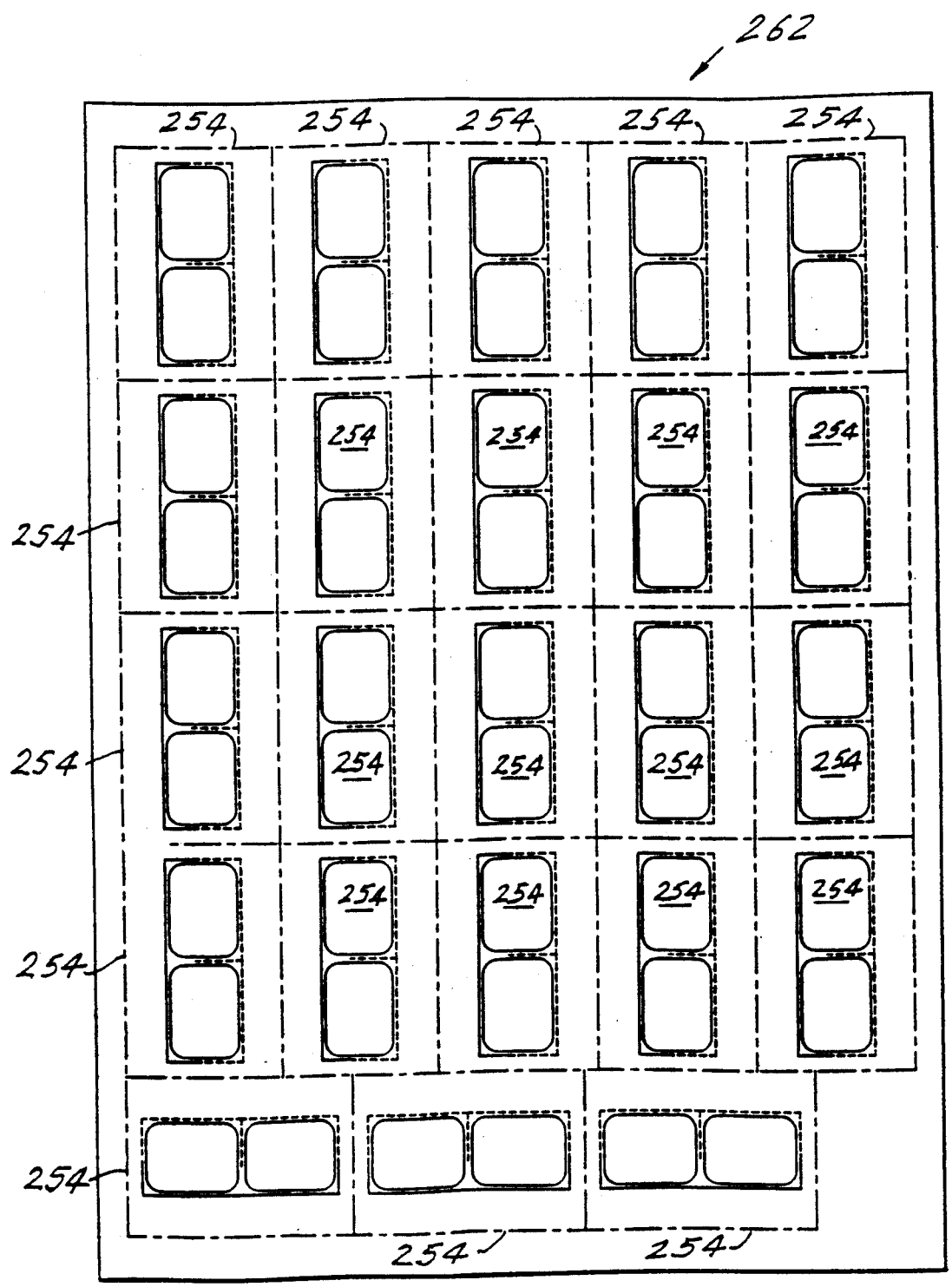
FIG. 22 is a reduced plan view of a blank for forming the mount of FIG. 21.

Twenty-three of the mounts 254 can be cut out of a single blank 262 (FIG. 22).

Description of Entirely Transparent Embodiment

Figure 23:
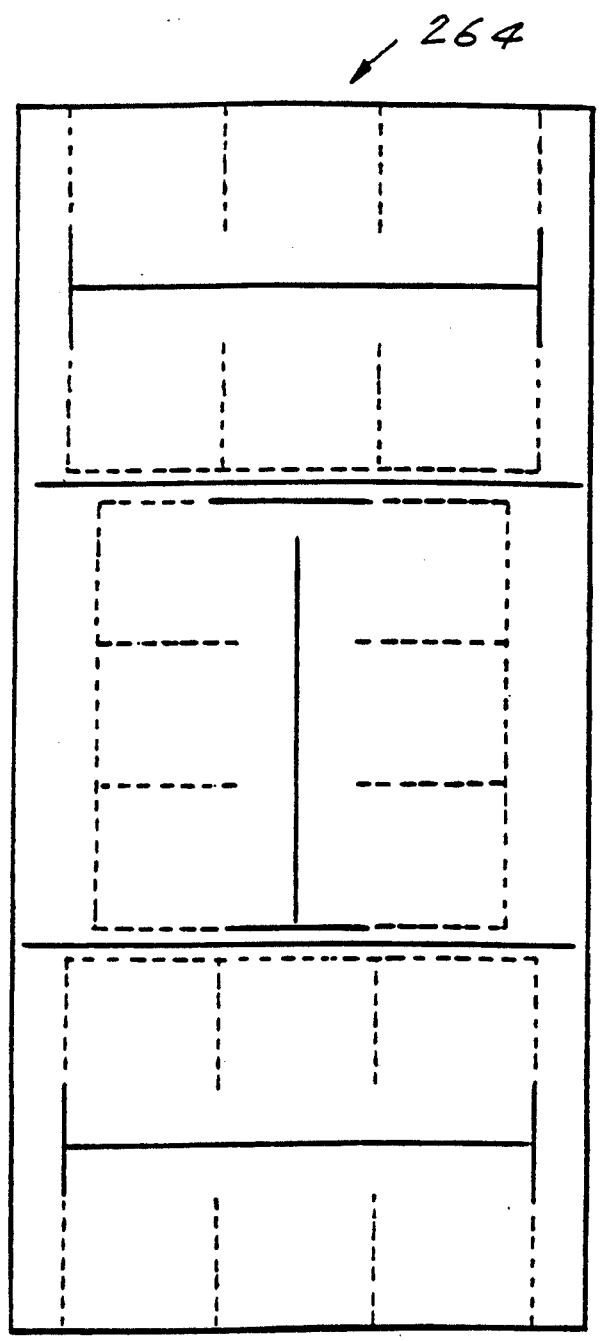
FIG. 23 is a plan view of an entirely transparent mount.

Although the embodiments described above all include a front sheet with an opaque surface, advantageous features of the present invention can be realized in products which are entirely transparent, i.e., without silk screened ink. Such entirely transparent products may be used as a common layout X-ray mount for mounting individual X-rays in position for viewing and storage. Such products are identical to the products illustrated in FIGS. 1–22 except that the entirely transparent products do not include silk screened ink or windows defined thereby. An example of such an entirely transparent product corresponding to the mount 30 of FIG. 1 is indicated generally at 264 in FIG. 23.

The present invention is not limited by the details described above.

For example, instead of silk-screening the front surface of the front sheet 36 with light gray ink, another coating process and/or another color may be used.

Further by way of example, the two folding slits of the longer embodiments (such as those with eighteen or twenty windows) can be replaced by a single slit for folding purposes.

Further by way of example, instead of offset printing indicia on a mount, the indicia can be formed by a second silk screening operation.

Other bonding methods can be used instead of radio frequency bonding. For example, ultrasonic sealing, or an adhesive can be used to bond the sheets 34 & 36 to each other along the cut/bond lines 52 and the bond lines 54.

Further, mounts according to the present invention can be formed from continuous, roll-fed material, rather than the blanks described above. The mounts can also be individually manufactured.

Indeed, although the present invention has been described in connection with preferred embodiments thereof, many variations and modifications may become apparent to those skilled in the art. It is preferred, therefore, that the present invention be limited not by the specific disclosure herein, but only by the appended claims.

What is claimed is:

1. A device for mounting a transparency, said device comprising:
    a front sheet of transparent plastic, said front sheet of transparent plastic comprising outer edges;
    an opaque coating on said front sheet of transparent plastic, said opaque coating defining a first generally rectangular window, said first generally rectangular window having a first side, a second side, a third side, and a fourth side, said first generally rectangular window being of a size to permit said transparency to be viewed through said window but to substantially prevent light from leaking around said transparency; and
    a back sheet of transparent plastic, said back sheet of transparent plastic comprising outer edges, said outer edges of said back sheet of transparent plastic being continuously bonded to said outer edges of said front sheet of transparent plastic, said back sheet of transparent plastic being continuously bonded to said front sheet of transparent plastic along said first, second, and third sides of said first generally rectangular window to form a pocket between said front sheet of transparent plastic and said back sheet of transparent plastic for receiving said transparency, said back sheet of transparent plastic itself comprising a slit, said slit having two ends, said ends of said slit being surrounded by said outer edges of said back sheet, said slit being located along said fourth side of said first generally rectangular window so as to provide an opening for inserting said transparency into said pocket.

2. The device of claim 1, wherein said back sheet further comprises a flap for inserting said transparency into said pocket.

3. The device of claim 2, wherein said opaque coating defines a second generally rectangular window located next to said first window, said second window having a first side which is adjacent to said third side of said first window, said second window having a fourth side which is parallel to said fourth side of said first window, said sheets being bonded to each other between said windows by only a single bond, said single bond being a continuous bond.

4. The device of claim 3, wherein said slit extends continuously across both of said fourth sides.

5. The device of claim 1, further comprising into thirds.

6. The device of claim 5, wherein said folding means comprises a slit.

7. The device of claim 1, wherein said sheets are formed of clear rigid polyvinyl chloride with a thickness of about 0.005 inches (0.13 mm).

8. The device of claim 1, wherein said edges of said sheets are simultaneously bonded to each other and cut.

9. The device of claim 1, wherein said opening slit is formed by die cutting.

10. The device of claim 1, wherein said transparency is dental X-ray film.

11. A preliminary article of manufacture for forming a plurality of devices for mounting a transparency, said article comprising:
    a front sheet of transparent plastic, said front sheet of transparent plastic comprising outer edges;
    an opaque coating on said front sheet of transparent plastic, said opaque coating defining a first generally rectangular window, said first generally rectangular window having a first side, a second side, a third side, and a fourth side, said first generally rectangular window being of a size to permit said transparency to be viewed through said window but to substantially prevent light from leaking around said transparency; and
    a back sheet of transparent plastic, said back sheet of transparent plastic comprising outer edges, said outer edges of said back sheet of transparent plastic being continuously bonded to said outer edges of said front sheet of transparent plastic, said back sheet of transparent plastic being continuously bonded to said front sheet of transparent plastic along said first, second, and third sides of said first generally rectangular window to form a pocket between said front sheet of transparent plastic and said back sheet of transparent plastic for receiving said transparency, said back sheet of transparent plastic itself comprising a slit, said slit having two ends, said ends of said slit being surrounded by said outer edges of said back sheet, said slit being located along said fourth side of said first generally rectangular window so as to provide an opening for inserting said transparency into said pocket.

12. The preliminary article of manufacture of claim 11, wherein said article is a blank.

13. A device for mounting a transparency, said device comprising:
    a front sheet of transparent plastic, said front sheet of transparent plastic comprising outer edges; and
    a back sheet of transparent plastic, said back sheet of transparent plastic comprising outer edges, said outer edges of said back sheet of transparent plastic being continuously bonded to said outer edges of said front sheet of transparent plastic, said back sheet of transparent plastic being continuously bonded to said front sheet of transparent plastic along three sides to form a generally rectangular pocket between said front sheet of transparent plastic and said back sheet of transparent plastic for receiving said transparency, said back sheet of transparent plastic itself comprising a slit, said slit having two ends, said ends of said slit being surrounded by said outer edges of said back sheet, said slit providing an opening for inserting said transparency into said pocket.

14. The device of claim 4, wherein said opening slit has two opposite ends, said back sheet further comprising side slits which are located at said opposite ends of said opening slit, said opening slit and said side slits together forming a flap for inserting said transparency into said pocket.

15. The device of claim 1, wherein said slit is formed before said outer edges of said back sheet are bonded to said outer edges of said front sheet.

* * * * *